July 21, 1959     E. J. TOOMEY     2,896,024
HEARING-AID HAVING DIRECTIONAL RECEPTION CHARACTERISTICS
Filed Oct. 28, 1954

INVENTOR
Eugene James Toomey
BY Stevens, Davis, Miller & Mosher
ATTORNEYS

United States Patent Office 2,896,024
Patented July 21, 1959

2,896,024

HEARING-AID HAVING DIRECTIONAL RECEPTION CHARACTERISTICS

Eugene James Toomey, Dallas, Tex., assignor to Texas Instruments Incorporated, Dallas, Tex., a corporation of Delaware Application October 28, 1954, Serial No. 465,311

4 Claims. (Cl. 179—107)

This invention relates to the combination of a rigid support and a hearing-aid mounted therein and more particularly in such combination to a hearing-aid device having directional characteristics of reception.

In the development of hearing-aids up to the present time, one important and desirable characteristic has been overlooked. This characteristic known as the binaural effect, is the one found in the unimpaired natural hearing mechanism which enables one to detect almost immediately the direction from which a sound is emanating. The binaural effect is possible because of the arrangement of the natural hearing apparatus which consists of two separate detectors (ears) located, in the case of man, on opposite sides of the head, each having a separate output (auditory nerve) to the brain. The brain determines the general direction of the sound source by subconsciously comparing the amplitude and time difference of arrival of the signals from each ear.

Present hearing-aids usually have as their only function the amplification of sound to the point at which it can be detected by a user. These devices concentrate their effect on one ear only, that is, they have only one reproducer. This is somewhat like correcting vision with a pair of eyeglasses having only one lens so that the vision of only one eye is corrected while the other eye is ignored. Development efforts so far seem to have been aimed only at the restoration of hearing by as small a device as possible and not to the restoration of normal hearing. The restoration of normal hearing includes restoring the power to determine quickly the direction from which a sound is coming.

The power to determine quickly the direction from which a sound is coming is not present when there is only one detector, or when there are two detectors with a common output, because there can be no comparison of the signals. A single output device such as the one disclosed by A. N. Scaife, U.S. Patent No. 2,613,282, can detect the direction from which a sound is coming only by rotating the detector until its output signal is greatest. However, this procedure takes time and requires a detector that exhibits its highest response only when the sound waves are received from directly in front of it. Of course, if the sound is of short time duration the single output device is useless as a direction finder, since the user does not have time to rotate the detector and find the direction producing the greatest signal intensity.

Further, in the prior art, there are devices having a hearing aid mounted in eyeglass frames which consists of two separate sound channels with the eyeglass lenses serving as sound detectors or microphones feeding the two sound channels. Such a device is disclosed in U.S. Patent No. 2,207,705 to Cox. The specification of this patent states that these two channels can be entirely separate or have inter-connections which cause the microphones to operate either in parallel or in series. Also, the batteries can be interconnected, if desired, to operate either in series or parallel. However, the two channels in the Cox device do not produce the binaural effect, which is the object of the present invention, because the lens microphones are so closely spaced that any phase and time difference in the arrival of sounds is too slight to be useful in determining quickly the direction from which the sounds are received.

It is a major object of the present invention to provide a novel design which overcomes the above named disadvantages found in hearing-aids now available. From the foregoing, it can be easily understood that any hearing-aid which is to allow its user to quickly determine the direction from which he is receiving a sound must have two independent channels effecting a separate input to each ear with sufficient spacing between the microphones of the two channels to produce a detectable phase and arrival time difference in the sound signals.

This is accomplished by the present invention by providing a hearing-aid having two separate sound channels, one for each ear with the spacing between the microphones sufficiently great to preserve for its user the power to determine quickly, by subconscious comparison of received signals, the direction from which a sound is received. In order to overcome the unsightly appearance of the sound reproducers and their associated wiring which would be visible when one is wearing an ordinary hearing-aid, the present invention in its preferred form closely resembles a frame for eyeglasses and may indeed be used to mount spectacle lenses if so desired. Completely concealed in each earpiece of the frame is a complete hearing-aid unit containing a microphone, power supply, amplifier, reproducers and the necessary interconnecting wiring. The microphones are placed as near to the ear as possible in order that the normal phase and time relationship of the sound waves received at each ear will be maintained.

The above objects and details as well as other objects and advantages of this invention will become apparent from the following description when taken together with the drawings in which.

Figure 1:
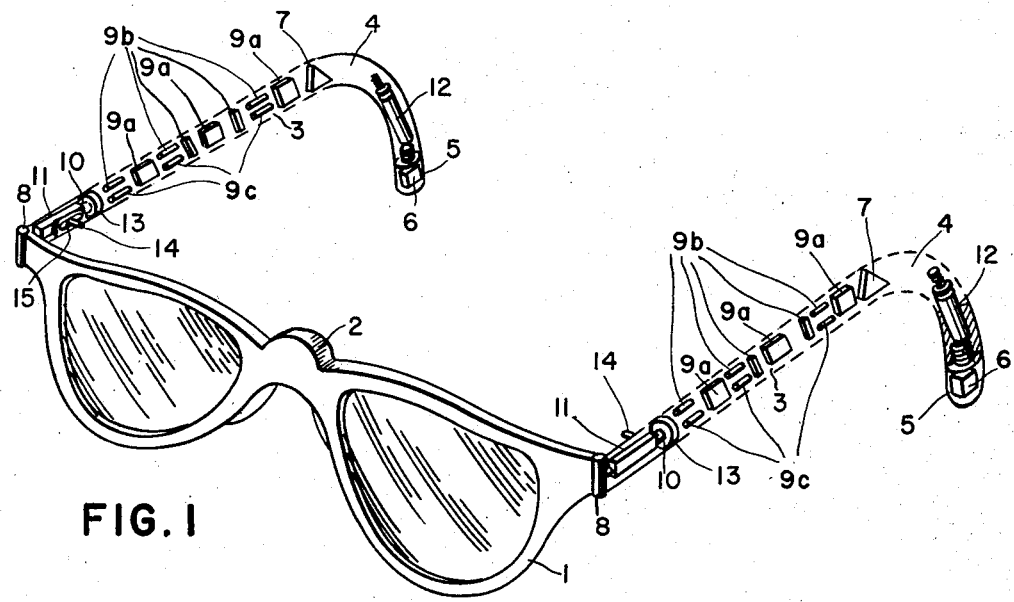
Figure 1 is a view in perspective of the preferred form of the present invention illustrating the various parts concealed within each earpiece.

Referring to Figure 1 there will now be described the preferred embodiment of the invention. The hearing-aid is shown mounted in a support designated generally as 1 having the general configuration of eyeglass frames, and intended to be worn in the same manner as eyeglasses. That is, the bridge section 2 rests on the nose of the wearer, the ear pieces 3 extend past the temples and just above the ears, and the curved portions 4 hook behind the wearer's ear so that tips 5 rest against the mastoid bones.

Inbedded in each tip 5 is a bone conductor type reproducer 6 which transmits the amplified sound vibrations through the mastoid bones to the auditory nerve of the wearer. Tiny microphones 7 are placed, one in each earpiece, in such a manner that they will be just above and slightly in front of the wearer's ears. Preferably these microphones have either non-directional or cardioid response characteristics, but this is not essential. The remainder of each earpiece from the microphone forward almost to hinge 8 is devoted to housing the necessary circuits and components such as transistors $9a$, resistors $9b$, capacitors $9c$, on-off switch 10 and gain control 11 which comprise a complete sound amplifier or hearing aid channel. The components, together with their associated wiring, may be imbedded in the earpiece when it is formed or cast as shown in Figure 1 or they may be mounted on a small "printed circuit" board to be inserted as a unit in an earpiece formed with a hollow section for this purpose.

The on-off switch 10 for each channel is located near the front section of each earpiece. Its control is a turnable ring 13 operated by the fingers of the user. When the ring is twisted in one direction, the circuit is energized, and when twisted in the opposite direction, the circuit is de-energized. The volume control for each channel is a small potentiometer or variable resistor 11. The potentiometer resistance determines the gain of the amplifier channel and is changed by movement of the control bar 14 which projects through a slot 15 in each earpiece.

A power source or battery 12 of the type generally used for hearing aids is disposed within the hollow curved section 4 of each earpiece between the microphone and reproducer. Tip section 5 of the earpiece can be removed to give access to this compartment when battery replacement is necessary.

Figure 2:
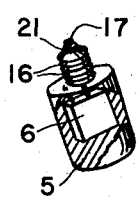
Figure 2 is a partially sectional view in perspective showing in some detail the removable bone conductor type reproducer section of the device of Figure 1.

Figure 2 shows in detail the tip section 5 containing the sound reproducer 6. The tip is attached to the earpiece of the hearing aid frame by engagement of threads 16 with matching threads in curved portion 4 of earpiece 3. The threads on both pieces are of metal and effect one electrical connection to the reproducer. The connection completing the circuit is through a small metal contact 17 in the end of tip section 5 which is separated from the threads 16 by some insulating material 21 such as glass in much the same manner as the center contact of an ordinary light bulb.

Figure 3:
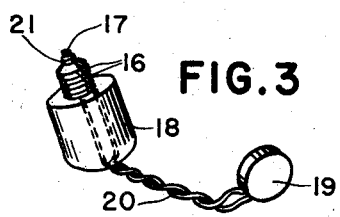
Figure 3 is a view in perspective illustrating an air conductor type sound reproducer as the removable section of Figure 1.

It is recognized that many users of hearing aids prefer an air conductor reproducer of the type worn in the ear rather than the bone conductor type. Therefore, as illustrated in Figure 3, a tip 18 having an air conductor reproducer 19 may be substituted for the bone conductor 6 in tip 5 of Figure 2. The contact 17 and the threaded portion 16 are the same as the tip of Figure 2, but since the reproducer is to be worn in the ear, short wires 20 are provided to carry the electrical signal to the reproducer 19.

Figure 4:
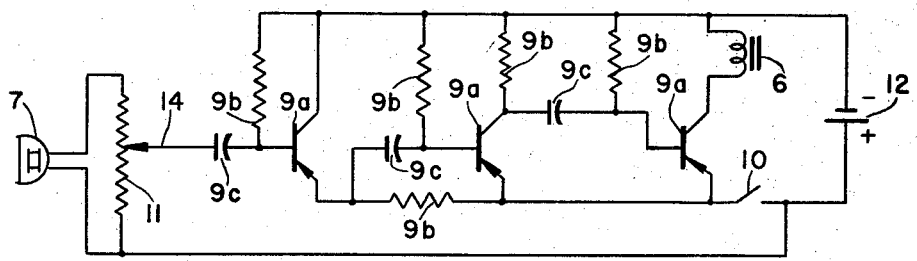
Figure 4 is a schematic diagram of one type of hearing-air circuit which can be used in the present invention.

Figure 4 is a schematic diagram of a hearing-aid circuit appearing in Electronic Design for November 1953, p. 18, which is well suited for use in the present invention. In this circuit a varying voltage proportional to the intensity and frequency of sound waves striking crystal microphone 7 is induced across resistance 11. This voltage is amplified by transistors 9a and reconverted to sound vibrations by transducer 6 or 19 as the case may be.

It is well known to those skilled in the art that hearing-aids may be operated by many different types of electrical circuits. Therefore, any operable electrical circuit may be employed in this hearing-aid since this invention is not concerned with amplifier circuitry, but only with a means to restore a sense of sound directivity to wearers of hearing aids. For the same reason, the form of mounting the hearing-aid is immaterial so long as the principles of a separate and independent sound channel for each ear and sufficiently spaced microphones are present.

Although the present invention has been shown and described with reference to particular embodiments, nevertheless, various changes and modifications obvious to one skilled in the art are felt to be within the spirit and contemplation of this invention.

What is claimed is:

1. A hearing aid having directional characteristics of reception comprising a support adapted to be worn in substantially fixed position on the head of the user and having the general configuration of a spectacle frame, means for converting sound impulses mounted in each earpiece of said spectacle frame adjacent the ears of the user, a sound reproducer carried by each end of the earpieces of said spectacle frame, and independent connections between said means and said sound reproducer mounted in one earpiece and between said means and said sound reproducer mounted in the other earpiece whereby electrical impulses produced by said means in turn independently produce audible sounds in the sound reproducers.

2. A hearing aid as defined in claim 1 wherein said independent connections are housed within said earpieces to be completely invisible from without.

3. A hearing aid as defined in claim 1 wherein said independent connections each include switch means and gain control means located for easy access.

4. A hearing aid as defined in claim 1 wherein the end of each said earpiece carrying a sound reproducer is detachably connected with the remainder of its respective earpiece.

References Cited in the file of this patent

UNITED STATES PATENTS

| 1,154,069 | Soret | Sept. 21, 1915 |
| 2,207,705 | Cox | July 16, 1940 |
| 2,613,282 | Scaife | Oct. 7, 1952 |
| 2,765,373 | Smith | Oct. 2, 1956 |
| 2,787,670 | Rowland | Apr. 2, 1957 |

FOREIGN PATENTS

| 494,016 | Italy | May 15, 1954 |